United States Patent [19]
Kyri et al.

[11] 3,765,931
[45] Oct. 16, 1973

[54] GLASS-LIKE COATINGS WITH OXIDATION-PROMOTING PROPERTIES
[75] Inventors: Hans Kyri; Albert Reiss, both of Koeln; Josef Suss, Leverkusen-Rheindorf, all of Germany
[73] Assignee: Bayer Rickmann GmbH, Koeln, Germany
[22] Filed: July 7, 1972
[21] Appl. No.: 269,700

[30] Foreign Application Priority Data
July 17, 1971   Germany................... P 21 35 835.0

[52] U.S. Cl...................... 117/129, 106/48, 126/19
[51] Int. Cl.............................................. A21b 1/00
[58] Field of Search...................... 117/129; 106/48, 106/52; 126/19; 252/428, 439

[56] References Cited
UNITED STATES PATENTS
3,580,733   5/1971   Ott..................................... 117/129
3,671,278   6/1972   Borowski......................... 117/129 X
3,565,830   2/1971   Keith et al. ..................... 252/439 X Primary Examiner—Alfred L. Leavitt
Assistant Examiner—David A. Simmons
Attorney—Ralph D. Dinklage et al.

[57] ABSTRACT

Metallic substrates such as steel plate are provided with a glass-like silicate coating which promotes oxidation by applying thereto a slip comprising a frit, about 5 to 30 percent of alumina and up to about 8 percent of a clay based on the weight of the frit. The frit contains about 0.3 to 6 percent by weight, calculated as the oxide, of a heavy metal such as cobalt, nickel, manganese, copper and/or iron, and combined sulfur present in about 0.3 to 7.5 percent by weight calculated as barium sulfide. The coated plate is then fired. A preferred frit composition comprises, by weight:

$SiO_2$ — 40 to 60 percent,
$B_2O_3$ — 0 to 10 percent,
$Al_2O_3$ — 0.5 to 7.5 percent,
alkali metal oxides — 10 to 25 percent,
alkaline earth metal oxides — 5 to 27 percent,
heavy metal oxides — 0.3 to 6 percent,
and fluorine
fluorine — 0 to 5 percent, and
sulfur calculated as BaS — 0.3 to 3 percent.

7 Claims, No Drawings

GLASS-LIKE COATINGS WITH OXIDATION-PROMOTING PROPERTIES

This invention relates to glass-like coatings with oxidation-promoting properites for aritcles of metal, in particular iron.

In baking, roasting or grilling, deposits of fat, protein and carbohydrates accumulate in the ovens of cookers, and these are extremely difficult to remove by conventional domestic cleaning methods. In general, the ovens have an enamel coating which is seriously damaged by this cleaning, which is predominantly mechanical. Deposits which are formed subsequently adhere all the more firmly to the roughened, damaged enamel surface and can no longer be completely removed. Accordingly, the ovens assume an unhygienic appearance.

Deposits of a different kind, but with similarly unpleasant properties, are formed in the exhaust systems of internal combustion engines. Since these resin-like carbonized deposits cannot, as a rule, be completely removed and since, as already mentioned, even their partial removal may result in damage to the substrate, many attempts have been made to replace chemical and mechanical methods of cleaning. For example, it is possible to obtain cookers whose ovens can be heated after use to temperatures of 500°C. and higher. As a result, the deposits are carbonized and can thus be removed. However, the outlay which this involves is considerable, especially since the cookers must be effectively isolated from their surroundings. It has also been proposed that the gases given off during heating may be passed through a second combustion chamber which is provided with a catalytically active surface. In this way it is intended that the exhaust gases should be completely burnt to avoid pollution.

In another process, the formation of deposits is avoided while the oven is actually in use. The surface of the ovens are provided with oxidation-promoting agents which enable organic materials to be burnt at temperatures as low as 200° to 300°C. The oxidation catalysts can either be applied to the surface of a supporting material or embedded in an enamel coating. The supporting materials are generally oxidic materials of ceramic- or glass-like composition. The catalytically active substances used are either metals, preferably noble metals, or metal oxides. Thus, for example, enamel coatings which contain from 10 to 70 percent by weight of metal oxides are known. A content of 20 percent by weight of the catalytically active oxide, based on the total weight of the finished enamel layer, is generally encountered in practice. The oxides of cobalt, manganese, copper and chromium have been noted as examples of catalytically active substances. One considerable economic disadvantage of these oxidation-promoting coatings is the high content of metal oxide.

One feature common to all oxidation-promoting coatings is the production of an effective surface which is extremely rough, i.e., the specific surface is greatly increased compared with a smooth surface. Accordingly, it is essentially an application of experience gained in the art of catalytic processes.

Ground costs for steel plate contain oxides of cobalt, nickel, manganese or copper as adhesion promoters. As a rule, the total quantity fo these oxides only occasionably exceeds 4 percent. It is known that these adhesive oxides lose some or all of their effect if sulfides are present in the enamel, depending upon the sulfuric content. It is assumed that if sulfides of the metals are in the adhesive layer these will no longer have the property of promoting adhesion.

The present invention relates to glass-like mixtures for the production of oxidation-promoting coatings on metallic substrates, in particular on steel plate, which coatings contain, in a predominantly silicate matrix, compounds of the heavy metals cobalt, nickel, manganese, copper and/or iron in a quantity of from about 0.3 to 6 percent by weight, calculated in terms of the oxides, and sulfuric in the form of sulfide in a quantity of from about 0.3 to about 7.5 percent by weight, calculated in terms of barium sulfide.

It has surprisingly been found that the catalytic effect of heavy metal oxides in glass-like coatings in respect to the combustion of organic vapors and deposits is not diminished, but on the contrary is considerably intensified in the presence of sulfides. Compared with conventional processes, therefore, the content of the heavy metal compounds can be considerably reduced. In general, a quantity of up to about 5.0 percent by weight, calculated in terms of the oxides, is sufficient. Larger quantities are not economical, although they are not harmful. The optimum catalytic effect of the heavy metals is developed where the atomic ratio in the frit of the divalent heavy metals to the sulfidic sulfur is from about 1:0.8 to 1:1.2, with an oxide content in the finished coating (enamel) of from about 3 to 6 percent by weight.

Frits of about the following composition are suitable for producing these glass-like coating with the self-cleaning properties:

$SiO_2$ — 40 to 60 percent by weight;
$B_2O_3$ — 0 to 10 perent by weight;
$Al_2O_3$ — 0.5 to 7.5 percent by weight;
Alkali metal oxides ($Li_2O + Na_2O + K_2O$ — 10 to 25 percent by weight;
Alkaline earth metal oxides ($CaO + SrO + BaO$)— 5 to 27 percent by weight;
$F^-$ — 0 to 5 percent by weight;
$S^{--}$ — 0.3 to 3 percent by weight;
Heavy metal oxides ($FeO + CoO + NiO + MnO + CuO$)—0.3 to 6 percent by weight.

It is possible by choosing the starting materials in the known manner within these composition ranges to produce glass-like coatings which have desired firing temperatures and adhesion properties for metallic substrates (enamels). One important feature in preparing the frits for this purpose is the addition of sulfides or of sulfur compounds which form sulfides during the fusion process. It is advantageous to provide reducing conditions during fusion of the frits. In order to avoid undesirable losses of sulfur by oxidation, the mixture of starting materials should contain as few oxidizing constituents as possible. It has proved to be particularly advantageous to add reducing materials, for example carbon powder, to the mixture of starting materials in order to keep all the sulfur in sulfidic form or, where sulfur itself is added, to convert it into sulfidic sulfur. Apart from sulfur, it is possible to use any starting materials which are able to form sulfides with the other constituents during the fusion process and which, in addition, do not interfere in any way with formation of the glass-like coating compositions having the aforementioned composition. In addition to elemental sulfur, the alkaline earth metal sulfides can be readily used. Alkali metal sulfides or heavy metal sulfides can also be used.

In other respects, the frits are prepared with starting materials commonly used in the enamelling industry at fusion temperatures of from about 1100° to 1400° C. For application, the ground or flaked frits are further ground in a mill in which clay, set-up salts and water are added to the slip. Hydrated alumina or aluminum oxide are also added in the mill in a quantity of from about 5 to 30 percent by weight, based on the total weight of the frit. Some of the heavy metal oxides can also be advantageously added during the preparation of the slip. The catalytically active surface is enlarged by the addition of the hydrated alumina or aluminum oxide. It has been noted that on firing, the oxidic constituents of the mill clay form a substantially homogeneous glass-like mass with the constituents of the frit, in the same way as the $Al_2O_3$.

The slip is applied to the substrate to be coated by the usual methods of spraying, dipping or casting. The firing temperature is governed both by the composition of the frit and by the type of substrate. In general, it is in the range from about 780°C. Articles of steel plate or iron are preferably coated with a ground coat beforehand. The ground coats containing adhesive oxides known in the enamel industry are suitable for this purpose.

The invention is illustrated by the following Examples:

EXAMPLE 1

From a frit produced from a starting mixture having the following analysis:

| | parts by weight |
|---|---|
| $SiO_2$ | 47.63 |
| $Al_2O_3$ | 2.88 |
| $Na_2O$ | 13.8 |
| $K_2O$ | 0.34 |
| CaO | 26.80 |
| BaS | 7.0 |
| CoO | 0.9 |
| BaO | 0.8 |
| Total: | 100.15 |

(the CoO in the above frit can be replaced by approximately 1.2 parts by weight of CoS), a slip is prepared, the mill batch having the following compositions:

| | parts |
|---|---|
| Frit I | 100 |
| Clay | 4.0 |
| Hydrated alumina | 30.0 |
| CoO | 4.0 |
| Water | 65.0 |

This is applied by casting onto a suitably pretreated, ground-coated steel plate. After drying and firing at the normal enamel-firing temperatures of around 800°C., a coating of the following chemical composition is obtained:

Coating Example 1

| | parts by weight |
|---|---|
| $SiO_2$ | 39.1 |
| $Al_2O_3$ | 18.8 |
| $Na_2O$ | 10.9 |
| $K_2O$ | 0.3 |
| CaO | 21.2 |
| BaO | 5.5 |
| CoO | 3.9 |
| S$^{--}$ | 0.6 |
| Total: | 100.3 |

EXAMPLE 2

A slip is prepared as described in Example 1 the mill batch having the same composition but the frit having been prepared from a starting mixture having the following composition:

| | parts by weight |
|---|---|
| $SiO_2$ | 39.1 |
| $Al_2O_3$ | 18.8 |
| $Na_2O$ | 10.9 |
| $K_2O$ | 0.34 |
| CaO | 26.80 |
| BaS | 7.0 |
| NiO | 0.9 |
| BaO | 0.8 |
| Total: | 104.64 |

This is applied to prepared substrates. Favorable results were also obtained where the NiO was replaced by 1.2 parts by weight of NiS.

The composition of the coating obtained after firing at the same temperatures in Example 1 is as follows:

| | parts by weight |
|---|---|
| $SiO_2$ | 39.1 |
| $Al_2O_3$ | 18.8 |
| $Na_2O$ | 10.9 |
| $K_2O$ | 0.3 |
| CaO | 21.2 |
| BaO | 5.5 |
| CoO | 3.16 |
| NiO | 0.72 |
| S$^{--}$ | 0.6 |
| Total: | 100.28 |

EXAMPLE 3

A slip is prepared as in Examples 1 and 2 from a frit prepared from a starting mixture having the following composition:

| | parts by weight |
|---|---|
| $SiO_2$ | 49.2 |
| $Al_2O_3$ | 2.8 |
| $Na_2O$ | 13.3 |
| $K_2O$ | 0.33 |
| CaO | 25.8 |
| BaS | 6.8 |
| $MnO_2$ | 1.3 |
| BaO | 0.8 |
| Total: | 100.33 |

This is applied to a steel plate substrate. Favorable results were also obtained where the MnO was replaced by 1.3 parts by weight of MnS. After firing a coating of the following composition is obtained:

| | parts by weight |
|---|---|
| $SiO_2$ | 40.3 |
| $Al_2O_3$ | 18.6 |
| $Na_2O$ | 10.5 |
| $K_2O$ | 0.3 |
| CaO | 20.4 |
| BaO | 5.4 |
| $MnO_2$ | 1.0 |
| CoO | 3.2 |
| S$^{--}$ | 0.9 |
| Total: | 99.6 |

EXAMPLE 4

A frit prepared from a mixture of starting materials having the following oxidic analysis was used as described in Example 1:

| | parts by weight |
|---|---|
| $SiO_2$ | 50.4 |
| $Al_2O_3$ | 2.7 |
| $Na_2O$ | 13.0 |
| $K_2O$ | 0.3 |
| CaO | 25.3 |
| BaS | 6.6 |
| CoO | 0.9 |
| BaO | 0.75 |
| Total: | 99.95 |

EXAMPLE 5

A frit prepared from a mixture of starting materials having the following analysis (expressed as oxides) was used as described in Example 1:

|       | parts by weight |
|-------|-----------------|
| $SiO_2$ | 58.5 |
| $Al_2O_3$ | 6.8 |
| $Na_2O$ | 15.9 |
| $K_2O$ | 3.4 |
| $BaO$ | 2.8 |
| $FeO$ | 1.1 |
| $CaO$ | 6.9 |
| $S^{--}$ | 1.0 |
| $F^-$ | 3.4 |
| Total | 99.8 |

A mill batch as described in Example 1 is prepared therefrom and an enamel coating of the following composition subsequently obtained:

|       | parts by weight |
|-------|-----------------|
| $SiO_2$ | 47.2 |
| $Al_2O_3$ | 21.7 |
| $Na_2O$ | 12.5 |
| $K_2O$ | 2.7 |
| $BaO$ | 2.2 |
| $FeO$ | 0.8 |
| $CaO$ | 5.4 |
| $S^{--}$ | 0.8 |
| $CoO$ | 3.5 |
| $F^-$ | 2.7 |
| Total: | 99.5 |

EXAMPLE 6

The following mixture of starting materials are processed into a frit as described in Example 1:

|       | parts by weight |
|-------|-----------------|
| $SiO_2$ | 49.5 |
| $Al_2O_3$ | 2.8 |
| $K_2O$ | 8.0 |
| $Na_2O$ | 12.2 |
| $BaO$ | 9.9 |
| $CaO$ | 4.4 |
| $B_2O_3$ | 7.0 |
| $ZrO_2$ | 1.1 |
| $FeO$ | 1.1 |
| $S^{--}$ | 1.0 |
| $F^-$ | 3.0 |
| Total: | 100.0 |

Using a mill batch as described in Example 1 but with a slightly increased cobalt oxide content (4.9 parts per 100 parts of frit), a coating of the following composition is obtained:

|       | parts by weight |
|-------|-----------------|
| $SiO_2$ | 39.6 |
| $Al_2O_3$ | 19.9 |
| $Na_2O$ | 9.4 |
| $K_2O$ | 6.2 |
| $BaO$ | 7.6 |
| $CaO$ | 3.3 |
| $B_2O_3$ | 5.4 |
| $ZrO_2$ | 0.9 |
| $FeO$ | 0.9 |
| $CoO$ | 3.8 |
| $S^{--}$ | 0.8 |
| $F^-$ | 2.2 |
| Total: | 100.0 |

The coatings obtained after firing on ground-coated plates as described in Examples 1 to 6 have the same roughness as a fine- to average-grain abrasive paper and show gradations in color from dark grey through black-grey to black.

The considerable porosity of these coatings is reflected in the fact that drops of a liquid applied to them are quickly absorbed.

The cleaning effect of the enamel layers prepared as described in the preceding Examples was tested and assessed as follows:

10 X 10 cm plates were enamelled as described above. After heating to 200° C. these plates were coated with standard edible oils and molten edible fats by means of a striped brush. Thereafter they were heated to between 250° and 300°C for 1 to 2 hours.

After heating, the plates were cooled and assessed on the following scale.

The plate or layer of enamel does not show any discoloration, spots or residues over the coated areas:
  assessment: "very good"

The enamel shows hardly noticeable discoloration and edge marks in the areas coated:
  assessment: "good"

The enamel shows slight discoloration and noticeable edges:
  assessment: "satisfactory"

The enamel is darker in the coated areas and shows dull residues which are easy to remove mechanically:
  assessment: "adequate"

The enamel is heavily discolored in the areas coated and shows residues in the form of bright speckles which are either extremely difficult or totally impossible to remove by mechanical means:
  assessment: "inadequate"

In order to be recognized as serviceable a coated enamel should at least be assessed as "satisfactory" after 10 tests.

The enamels prepared as described in Example 1 to 6 were subjected to at least 12 tests and showed results ranging from "very good" to "satisfactory."

It will be appreciated that the instant specification and examples are set forth by way of illustration and not limitation, and that various modifications and changes may be made without departing from the spirit and scope of the present invention.

What is claimed is:

1. A metallic substrate coated with a glass-like silicate coating produced by applying to the substrate a composition comprising a predominantly silicate matrix, a compound of at least one heavy metal selected from the group consisting of cobalt, nickel, manganese, copper, and iron, said heavy metal compound being present in about 0.3 to 6 percent by weight calculated as the oxide, and sulfer present as sulfide in about 0.3 to 7.5 percent by weight calculated as barium sulfide and firing the substrate.

2. A coated substrate according to claim 1 wherein to the frit prior to application to the substrate there is added about 5 to 30 percent of aluminum oxide based on the weight of the frit.

3. A coated substrate according to claim 2 wherein the frit has the approximate composition by weight calculated as the oxides of
  $SiO_2$ — 40 to 60 percent.
  $B_2O_3$ — 0 to 10 percent,
  $Al_2O_3$ — 0.5 to 7.5 percent,
  alkali metal oxides — 10 to 25 percent,
  alkaline earth metal oxides — 5 to 27 percent,
  heavy metal oxides — 0.3 to 6 percent,
and
  fluorine — 0 to 5%, and
  sulfur calculated as BaS — 0.3 to 3%.

4. The process for the production of a metallic substrate coated with a glass-like silicate coating comprising forming a slip comprising a predominantly silicate matrix, a compound of at least one heavy metal selected from the group consisting of cobalt, nickel, manganese, copper, and iron, said heavy metal compound being present in about 0.3 to 6% by weight calculated as the oxide, and sulfur present as sulfide in about 0.3 to 7.5 percent by weight calculated as barium sulfide, based on the balance of the solids in said slip calculated as oxides, said slip further containing about 5 to 30 percent by weight of aluminum oxide and up to about 8 percent by weight of clay, forming a coating of said slip on said substrate, and firing the coated substrate.

5. The process of claim 4 wherein said slip is prepared from said aluminum oxide, said clay and a frit having an approximate composition by weight calculated as the oxides of $SiO_2$ — 40 to 60 percent,
$B_2O_3$ — 0 to 10 percent,
$Al_2O_3$ — 0.5 to 7.5 percent,
alkali metal oxides — 10 to 25 percent,
alkaline earth metal oxides — 5 to 27 percent,
heavy metal oxides — 0.3 to 6 percent,
and
fluorine — 0 to 5 percent, and
sulfur calculated as BaS — 0.3 to 3 percent.

6. The process of claim 5 in which at least a portion of the heavy metal oxide is added during the preparation of the slip.

7. The process of claim 5 in which the metallic substrate is coated with a ground coat prior to application of said slip to the metallic substrate.

* * * * *